US012656668B2

(12) United States Patent
Miya

(10) Patent No.: US 12,656,668 B2
(45) Date of Patent: Jun. 16, 2026

(54) ILLUMINATION APPARATUS AND PROJECTOR

(71) Applicant: SEIKO EPSON CORPORATION, Tokyo (JP)

(72) Inventor: Hiroaki Miya, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 303 days.

(21) Appl. No.: 18/422,205

(22) Filed: Jan. 25, 2024

(65) Prior Publication Data

US 2024/0255838 A1     Aug. 1, 2024

(30) Foreign Application Priority Data

Jan. 26, 2023    (JP) ................................. 2023-010064

(51) Int. Cl.
    *G03B 21/20*         (2006.01)
    *G03B 21/14*         (2006.01)
(52) U.S. Cl.
    CPC ....... *G03B 21/204* (2013.01); *G03B 21/2073* (2013.01)
(58) Field of Classification Search
    CPC .......................... G03B 21/204; G03B 21/2073
    See application file for complete search history.

(56) References Cited

U.S. PATENT DOCUMENTS

| | | | | |
|---|---|---|---|---|
| 10,088,743 B2 * | 10/2018 | Yasuda | ................ | G02B 27/286 |
| 11,079,667 B2 * | 8/2021 | Arihara | ................ | G02B 27/285 |
| 11,480,860 B2 * | 10/2022 | Miya | .................. | G03B 21/2073 |
| 11,720,012 B2 * | 8/2023 | Yasui | .................. | H04N 9/3158 |
| | | | | 353/20 |
| 2018/0217487 A1 * | 8/2018 | Yasuda | ............. | G03B 21/2073 |
| 2020/0073222 A1 * | 3/2020 | Arihara | ................ | H04N 13/307 |
| 2020/0409247 A1 * | 12/2020 | Miya | .................. | G03B 21/204 |
| 2022/0100074 A1 * | 3/2022 | Yasui | .................. | G03B 21/204 |

FOREIGN PATENT DOCUMENTS

JP          2004-12790 A       1/2004

* cited by examiner

*Primary Examiner* — Bao-Luan Q Le
(74) *Attorney, Agent, or Firm* — OLIFF PLC

(57)          ABSTRACT
An illumination apparatus includes a light source device configured to a light containing a first color light, a second color light, and a third color, and a polarization converter converting a first polarized light of the light emitted from the light source device into a second polarized light, wherein the polarization converter has a polarization separation part separating the light emitted from the light source device into the first polarized light and the second polarized light, and a wave plate converting the first polarized light into the second polarized light, 80% or more of the first color light output from the light source device is the second polarized light, and a wavelength at which polarization rotation efficiency of the wave plate is the highest is longer than a peak wavelength of the second color light and shorter than a peak wavelength of the third color light.

7 Claims, 9 Drawing Sheets

FIG. 3

POLARIZATION CONVERSION EFFICIENCY FOR EACH PEAK WAVELENGTH
OF WAVE PLATE
(PERCENTAGE OF s-POLARIZED BLUE LIGHT 50%)

POLARIZATION CONVERSION EFFICIENCY FOR EACH PEAK WAVELENGTH
OF WAVE PLATE (PERCENTAGE OF s-POLARIZED BLUE LIGHT 90%)

CHANGE RATES IN AMOUNTS AND CHANGE RATES IN LUMINANCE OF COLOR
LIGHTS OUTPUT FROM POLARIZATION CONVERSION ELEMENT

RELATIONSHIP BETWEEN PEAK WAVELENGTH OF WAVE PLATE AND
THICKNESS DIFFERENCE BETWEEN QUARTZ CRYSTAL PLATES

ILLUMINATION APPARATUS AND PROJECTOR

The present application is based on, and claims priority from JP Application Serial Number 2023-010064, filed Jan. 26, 2023, the disclosure of which is hereby incorporated by reference herein in its entirety.

BACKGROUND

1. Technical Field

The present disclosure relates to an illumination apparatus and a projector.

2. Related Art

In related art, a projector forming an image light according to image information by modulating a light output from a light source and projecting the formed image light is known (for example, see JP-A-2004-12790).

The projector disclosed in JP-A-2004-12790 includes a white light source, a polarization converter aligning polarization directions of lights output from the white light source, a liquid crystal panel modulating the polarized light output from the polarization converter, and a projection lens projecting the modulated light.

The polarization converter has a dielectric film, a total reflection film, and a retardation film. The dielectric film transmits a p-polarized light and reflects an s-polarized light of the lights output from the white light source. The total reflection film reflects and outputs the s-polarized light reflected by the dielectric film in parallel to the p-polarized light transmitted through the dielectric film. The retardation film converts the s-polarized light entering from the total reflection film into the p-polarized light and outputs the light.

Here, the retardation film has a peak wavelength at which polarization rotation efficiency is the highest and, as the wavelength of the entering light is farther from the peak wavelength, the polarization rotation efficiency is lower.

Accordingly, in the polarization converter disclosed in JP-A-2004-12790, when the peak wavelength of the retardation film is set in a wavelength range of green light, an s-polarized green light may be efficiently converted into a p-polarized green light, but s-polarized red light and blue light are not efficiently converted into p-polarized red light and blue light. On this account, there is a problem that the red light and the blue light are likely to be shielded by a polarizer provided at the light incident side of the liquid crystal panel and image brightness is hard to be increased.

Recently, the luminance of the light source is increasingly higher in response to the demand for higher brightness of a projection image, however, there is a problem that the brightness of the projection image is difficult to be sufficiently higher because the red light and the blue light are likely to be shielded as described above.

Therefore, a configuration that may increase a percentage of one type of linearly-polarized light in the output light is demanded.

SUMMARY

An illumination apparatus according to a first aspect of the present disclosure includes a light source device outputting a light containing a first color light in a first wavelength range, a second color light in a second wavelength range having longer wavelengths than the first wavelength range, and a third color light in a third wavelength range having longer wavelengths than the second wavelength range, and a polarization converter converting a first polarized light of the light output from the light source device into a second polarized light different from the first polarized light, wherein the polarization converter has a polarization separation portion separating the light output from the light source device into the first polarized light and the second polarized light, and a wave plate converting the first polarized light separated by the polarization separation portion into the second polarized light, 80% or more of the first color light output from the light source device is the second polarized light, and a wavelength at which polarization rotation efficiency of the wave plate is the highest is longer than a peak wavelength of the second color light and shorter than a peak wavelength of the third color light.

A projector according to a second aspect of the present disclosure includes the illumination apparatus according to the first aspect, a light modulation device modulating the light output from the illumination apparatus, and a projection optical device projecting the light modulated in the light modulation device.

BRIEF DESCRIPTION OF THE DRAWINGS

FIG. 3 is a sectional view showing a polarization converter according to the one embodiment.

DESCRIPTION OF EMBODIMENTS

As below, one embodiment of the present disclosure will be explained with reference to the drawings.

Schematic Configuration of Projector

Figure 1:
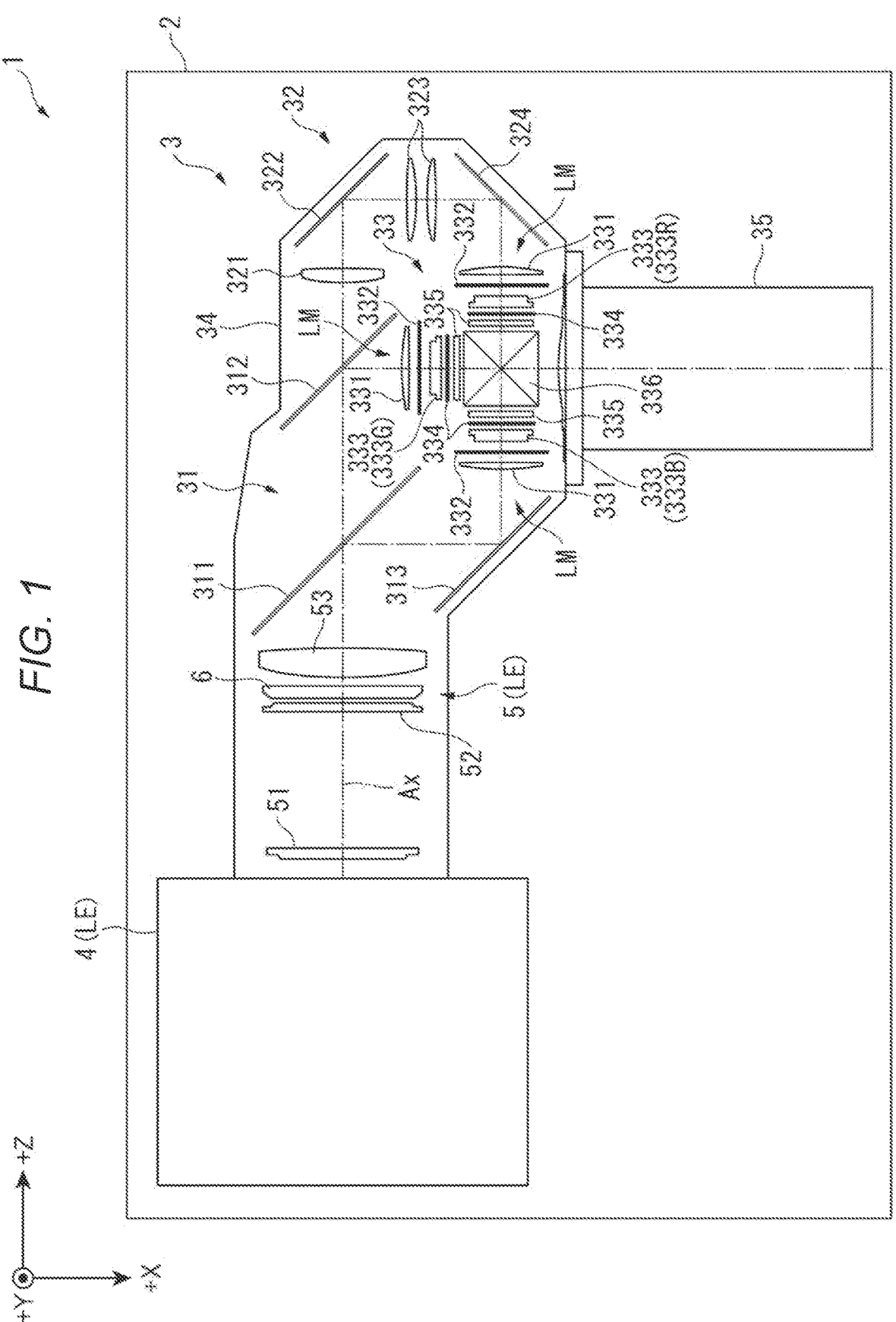
FIG. 1 is a schematic diagram showing a configuration of a projector according to one embodiment.

FIG. 1 is a schematic diagram showing a configuration of a projector 1 according to the embodiment.

The projector 1 according to the embodiment forms an image light according to image information by modulating a light output from a light source device 4 and enlarges and projects the formed image light on a projected surface.

As shown in FIG. 1, the projector 1 includes an exterior housing 2 and an image projection apparatus 3 housed in the exterior housing 2. Further, not shown in the drawings, the projector 1 includes a control device controlling operation of the projector 1, a power supply device supplying electric power to electronic components forming the projector 1, and a cooling device cooling objects to be cooled forming the projector 1.

Configuration of Image Projection Apparatus

The image projection apparatus 3 forms an image light according to image information input from the control device and projects the formed image light. The image projection apparatus 3 includes the light source device 4, a homogenization system 5, a color separation system 31, a relay system 32, an image formation device 33, an optical component casing 34, and a projection optical device 35.

In the following description, three directions orthogonal to one another are a +X direction, a +Y direction, and a +Z direction. The +Z direction is a direction in which the light source device 4 outputs an illumination light as seen from the +Y direction, and the +X direction is a direction in which the projection optical device 35 outputs an image light as seen from the +Y direction. Though not illustrated, an opposite direction to the +X direction is a –X direction, an opposite direction to the +Y direction is a –Y direction, and an opposite direction to the +Z direction is a –Z direction. Further, an axis parallel to the +X direction is an X-axis, an axis parallel to the +Y direction is a Y-axis, and an axis parallel to the +Z direction is a Z-axis.

Configuration of Light Source Device

Figure 2:
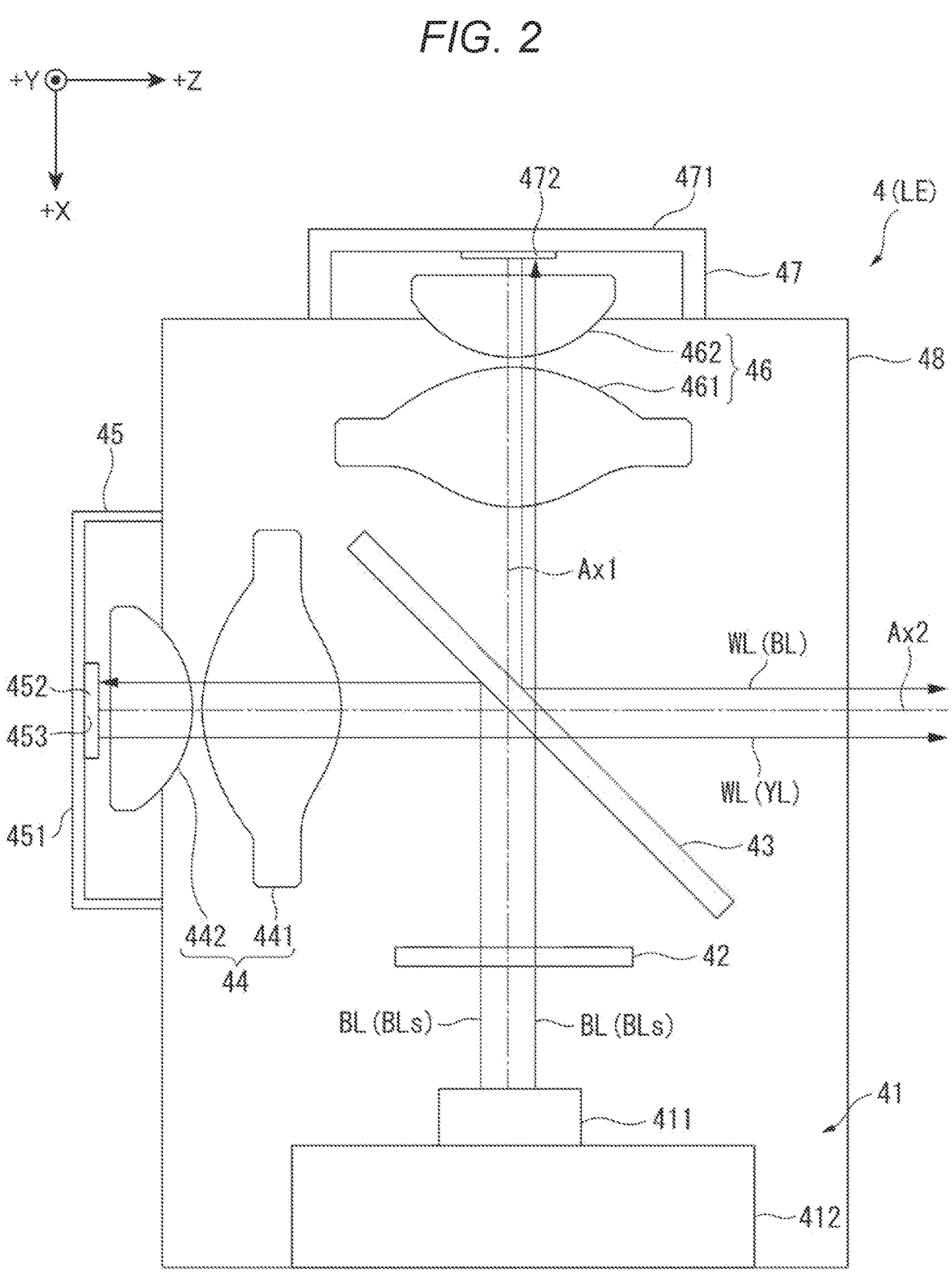
FIG. 2 is a schematic diagram showing a configuration of a light source device according to the one embodiment.

FIG. 2 is a schematic diagram showing a configuration of the light source device 4.

The light source device 4 forms an illumination apparatus LE with the homogenization system 5. The light source device 4 outputs an illumination light to the homogenization system 5. As shown in FIG. 2, the light source device 4 includes a light source 41, a diffuse transmission unit 42, a light separation unit 43, a first collection element 44, a wavelength converter 45, a second collection element 46, a diffuse reflection element 47, and a casing 48.

In the light source device 4, an optical axis Ax1 along the X-axis and an optical axis Ax2 orthogonal to the optical axis Ax1 and along the Z-axis are set. The optical components of the light source device 4 are placed on the optical axis Ax1 or the optical axis Ax2.

Specifically, the light source 41, the diffuse transmission unit 42, the light separation unit 43, the second collection element 46, and the diffuse reflection element 47 are placed on the optical axis Ax1.

The wavelength converter 45, the first collection element 44, and the light separation unit 43 are placed on the optical axis Ax2. That is, the light separation unit 43 is placed in an intersection portion of the optical axis Ax1 and the optical axis Ax2.

The optical axis Ax2 connects to an optical axis Ax of the image projection apparatus 3 in a position of a first lens array 51, which will be described later, of the homogenization system 5.

Configuration of Light Source

The light source 41 outputs a light in the –X direction. The light source 41 includes at least one light emitting device 411 and a substrate 412.

The light emitting device 411 outputs a blue light BL. The blue light is an excitation light exciting phosphor contained in the wavelength converter 45. The light emitting device 411 is a semiconductor laser outputting a laser beam having a peak wavelength of 455 nm, and the blue light BL output by the light emitting device 411 is an s-polarized blue light BLs. Note that an s-polarized light is a linearly-polarized light reflected by the light separation unit 43 and a polarization separation portion 63 of a polarization converter 6, which will be described later, and a p-polarized light is a linearly-polarized light transmitted through the light separation unit 43 and the polarization separation portion 63.

The substrate 412 supports the light emitting device 411 and is fixed to the casing 48. The substrate 412 is formed using e.g., a metal and releases heat transmitted from the light emitting device 411 to the outside of the casing 48.

Configuration of Diffuse Transmission Unit

The diffuse transmission unit 42 diffuses the blue light BLs entering from the light source 41 and outputs a light having a homogenized illuminance distribution. The blue light BLs output from the diffuse transmission unit 42 enters the light separation unit 43. As the diffuse transmission unit 42, a configuration having a hologram, a configuration in which a plurality of small lenses are arranged on a surface orthogonal to the optical axis, and a configuration having a rough surface as a surface through which a light passes may be exemplified.

Note that, in place of the diffuse transmission unit 42, a homogenizer optical element having a pair of multi-lens arrays may be employed in the light source device 4. On the other hand, when the diffuse transmission unit 42 is employed, compared to a case where the homogenizer optical element is employed, a distance from the light source 41 to the light separation unit 43 may be made shorter.

Configuration of Light Separation Unit

The light separation unit 43 has a function of a half mirror transmitting one part of the blue light BLs and reflecting the other part of the blue light BLs of the blue light BLs entering from the light source 41 via the diffuse transmission unit 42. That is, the light separation unit 43 reflects a first partial light as the one part of the blue light BLs in the –Z direction and enters the light into the first collection element 44 and transmits a second partial light as the other part of the blue light BLs in the –X direction and enters the light into the second collection element 46 of the blue light BLs entering from the diffuse transmission unit 42.

The light separation unit 43 has a function of a dichroic mirror of transmitting a fluorescence YL entering from the wavelength converter 45 in the +Z direction and reflecting the blue light BL entering from the diffuse reflection element 47 in the +X direction.

In the embodiment, in consideration of light absorption in the wavelength converter 45, the light separation unit 43 sets the amount of the first partial light to be smaller than the amount of the second partial light. However, the ratio between the amount of the first partial light and the amount of the second partial light can be adjusted. The amount of the first partial light and the amount of the second partial light may be the same or the amount of the second partial light may be larger than the amount of the first partial light.

Configuration of First Collection Element

The first collection element 44 collects the second partial light reflected by the light separation unit 43 in the wavelength converter 45. Further, the first collection element 44 parallelizes the light entering from the wavelength converter 45.

In the embodiment, the first collection element 44 has two lenses 441, 442, however, the number of lenses forming the first collection element 44 is not limited to two.

Configuration of Wavelength Converter

The wavelength converter 45 is a reflective wavelength converter diffusing the converted light formed by conversion of the wavelength of the entering light in an opposite direction to the incident direction of the light and outputting the light. Specifically, the wavelength converter 45 contains phosphor to be excited by entry of the blue light BL as the excitation light, reflects and diffuses the fluorescence YL having a longer wavelength than the entering blue light BL, and outputs the light toward the first collection element 44. The light output from the wavelength converter 45 is e.g., a fluorescence YL having a peak wavelength in a range from 500 to 700 nm, and the fluorescence YL contains a green light and a red light. That is, the wavelength converter 45 converts a first color light output from the light source 41 into a second color light and a third color light having longer wavelengths than the wavelength of the first color light.

The wavelength converter 45 has a substrate 451, a wavelength conversion layer 452, and a reflection layer 453.

The substrate 451 is a support formed using a metal and supports the wavelength conversion layer 452 and the reflection layer 453. The substrate 451 is fixed to the casing 48.

The wavelength conversion layer 452 is a phosphor layer containing a phosphor diffusing and outputting a non-polarized fluorescence YL formed by conversion of the wavelength of the blue light BL entered from the first collection element 44.

The reflection layer 453 is located at an opposite side to the incident side of the blue light BL with respect to the wavelength conversion layer 452 and reflects the fluorescence YL entering from the wavelength conversion layer 452.

The fluorescence YL output from the wavelength converter 45 passes through the first collection element 44 along the optical axis Ax2, and then, enters the light separation unit 43. The fluorescence YL entering the light separation unit 43 passes through the light separation unit 43 along the optical axis Ax2 and is output to the outside of the light source device 4.

Configuration of Second Collection Element

The second collection element 46 collects the second partial light entering from the light separation unit 43 in the diffuse reflection element 47. The second collection element 46 parallelizes the blue light entering from the diffuse reflection element 47.

In the embodiment, the second collection element 46 has two lenses 461, 462 like the first collection element 44, however, the number of lenses forming the second collection element 46 is not limited to two.

Configuration of Diffuse Reflection Element

The diffuse reflection element 47 has a substrate 471 fixed to the casing 48 and a diffuse reflection layer 472 provided on the substrate 471.

The diffuse reflection layer 472 reflects and diffuses the blue light BL entering from the second collection element 46 at substantially the same diffuse angle as the diffuse angle of the fluorescence YL output from the wavelength converter 45 or a diffuse angle slightly smaller than the diffuse angle of the fluorescence YL. That is, the diffuse reflection layer 472 reflects and diffuses an entering light without converting the wavelength of the entering light.

The blue light BL reflected in the +X direction in the diffuse reflection layer 472 passes through the second collection element 46, and then, is reflected in the +Z direction in the light separation unit 43 and output with the fluorescence YL to the outside of the light source device 4.

Configuration of Casing

The casing 48 houses the light source 41, the diffuse transmission unit 42, the light separation unit 43, the first collection element 44, the wavelength converter 45, the second collection element 46, and the diffuse reflection element 47. In the embodiment, the casing 48 is an air-tight casing hard for dust and dirt to enter. However, the casing is not limited to that as long as the casing 48 may house the above described optical components.

As described above, the illumination light WL output to the outside of the light source device 4 is the white light as a mixture of the blue light BL and the fluorescence YL containing the green light and the red light. The blue light BL corresponds to the first color light in the first wavelength range, the green light corresponds to the second color light in the second wavelength range having the longer wavelengths than the first wavelength range, and the red light corresponds to the third color light having the longer wavelengths than the second wavelength range. The peak wavelength of the blue light BL is 455 nm, the peak wavelength of the green light is 550 nm, and the peak wavelength of the red light is 610 nm. The peak wavelengths of the respective color lights are not necessarily limited to those described above, but the peak wavelengths may be wavelengths near the above described wavelengths.

Note that the light source 41 outputs the s-polarized light, and the percentage of the s-polarized light in the blue light output from the light source device 4 is higher than the percentage of the p-polarized light. On the other hand, the fluorescence YL output from the light source device 4 is the non-polarized fluorescence, and the percentages of the s-polarized lights and the percentages of the p-polarized lights in the green light and the red light contained in the fluorescence YL are substantially the same.

Configuration of Homogenization System

The homogenization system 5 shown in FIG. 1 forms the illumination apparatus LE with the light source device 4. The homogenization system 5 substantially homogenizes the illuminance and the polarization state of the illumination light output from the light source device 4 in the +Z direction and outputs the light. The illumination light output from the homogenization system 5 illuminates modulation areas of light modulation elements 333, which will be described later, through the color separation system 31 and the relay system 32.

The homogenization system 5 includes the first lens array 51, a second lens array 52, the polarization converter 6, and a superimposing lens 53.

The first lens array 51 has a plurality of first lenses (not shown) dividing the entering illumination light into a plurality of partial luminous fluxes.

Figure 3:
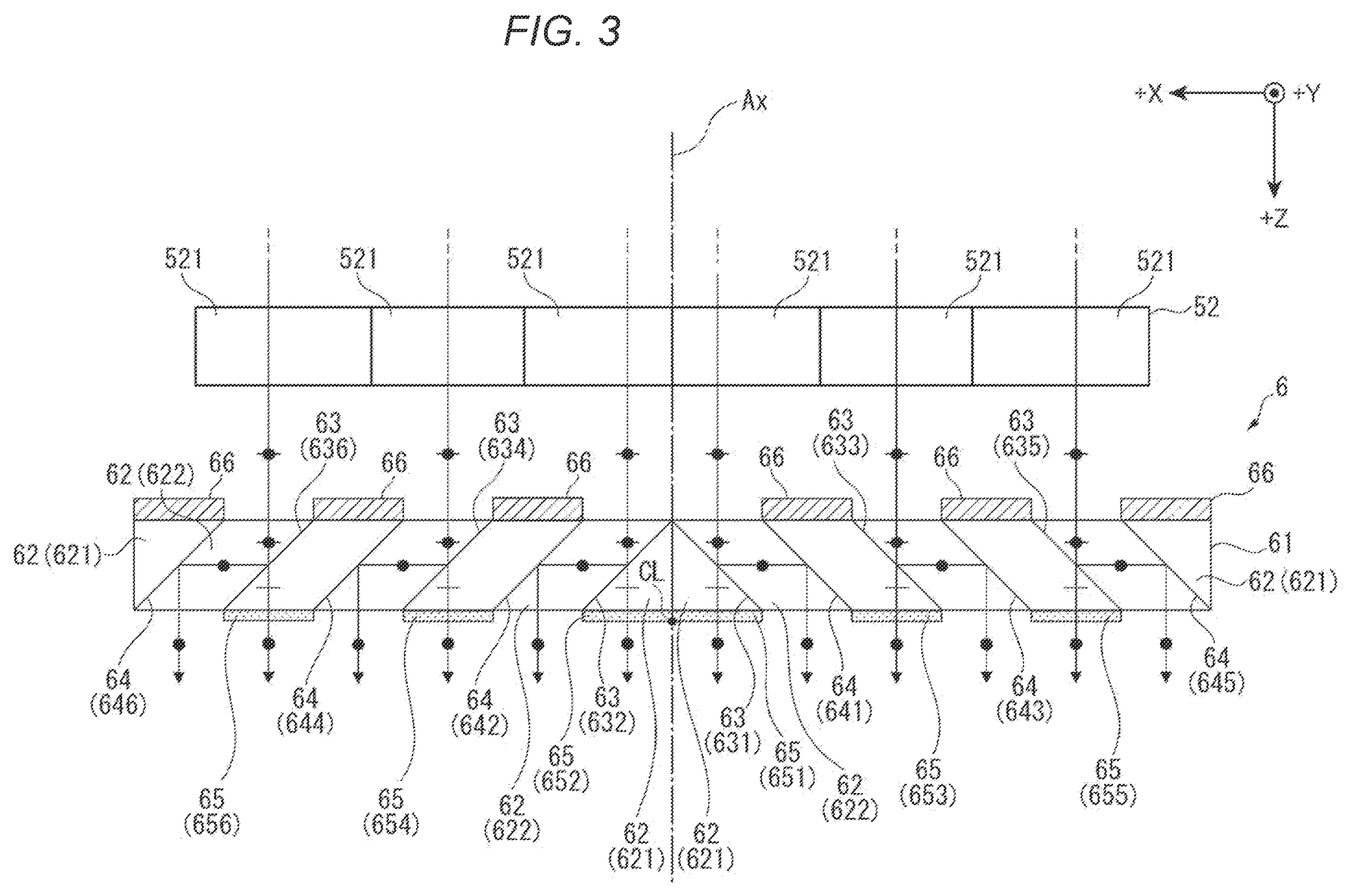

The second lens array 52 has a plurality of second lenses 521 corresponding to the plurality of first lenses and enters the partial luminous fluxes entering from the respective first lenses into the polarization converter 6. Note that the plurality of second lenses 521 are shown in FIG. 3, which will be described later.

The polarization converter 6 aligns the polarization directions of the lights entering from the second lens array 52. Specifically, the polarization converter 6 outputs the lights aligned in the same polarization direction by converting first polarized lights of lights output from the light source device 4 and entering via the respective lens arrays 51, 52 into second polarized lights different from the first polarized lights. In the embodiment, the polarization converter 6 converts the p-polarized light of the entering lights into the s-polarized light. The configuration of the polarization converter 6 will be described later in detail.

The superimposing lens 53 superimposes the lights entering from the polarization converter 6 on the respective light modulation elements 333 of the image formation device 33, which will be described later, with the second lens array 52.

Configuration of Color Separation System

The color separation system 31 separates the light entering from the homogenization system 5 into a red light, a green light, and a blue light. The color separation system 31 includes dichroic mirrors 311, 312 and a reflection mirror 313.

The dichroic mirror 311 separates the light entering in the +Z direction into a blue light, a green light, and a red light. Specifically, the dichroic mirror 311 reflects the blue light of the entering lights in the +X direction and transmits the green light and the red light in the +Z direction.

The dichroic mirror 312 separates the light entering from the dichroic mirror 311 in the +Z direction into the green light and the red light. Specifically, the dichroic mirror 312 reflects the green light of the entering green light and red light in the +X direction and transmits the red light in the +Z direction.

The reflection mirror 313 reflects the blue light separated by the dichroic mirror 311 in the +Z direction.

Configuration of Relay System

The relay system 32 is placed in an optical path of the red light longer than optical paths of the other color lights and suppresses a loss of the red light. The relay system 32 includes a light incident-side lens 321, a relay lens 323, and reflection mirrors 322, 324. In the embodiment, the red light is guided to the relay system 32. However, the configuration is not limited to that. For example, the color light having the longer optical path than the other color lights may be the blue light and the blue light may be guided to the relay system 32.

Configuration of Image Formation Device

The image formation device 33 modulates the respective entering color lights of red, green, and blue, combines the modulated respective color lights, and forms an image light. The image formation device 33 has three field lenses 331, three light incident-side polarizers 332, the three light modulation elements 333, three viewing angle compensators 334, three light exiting-side polarizers 335, and one light combining system 336 provided to correspond to the entering color lights.

The light modulation element 333 modulates the light output from the light source device 4 based on an image signal input from the control device. Specifically, the light modulation element 333 modulates the color light entering from the light incident-side polarizer 332 according to the image signal input from the control device and outputs the modulated color light. The three light modulation elements 333 include a light modulation element 333R for red light, a light modulation element 333G for green light, and a light modulation element 333B for blue light.

In the embodiment, as the light modulation element 333, a transmissive liquid crystal panel in which a light incident surface and a light exiting surface are different is employed. The light modulation element 333, the light incident-side polarizer 332, and the light exiting-side polarizer 335 form a light modulation device LM. The light modulation device LM is a liquid crystal light valve and modulates the light output from the illumination apparatus LE.

The light combining system 336 combines the three color lights modulated by the light modulation elements 333B, 333G, 333R and forms an image light. The image light formed by the light combining system 336 enters the projection optical device 35. In the embodiment, the light combining system 336 includes a cross dichroic prism substantially in a rectangular parallelepiped shape, but may include a plurality of dichroic mirrors.

The optical component casing 34 houses the above described homogenization system 5, color separation system 31, relay system 32, and image formation device 33. In the image projection apparatus 3, an optical axis Ax in design is set and the optical component casing 34 holds the homogenization system 5, the color separation system 31, the relay system 32, and the image formation device 33 in predetermined positions on the optical axis Ax. The light source device 4 and the projection optical device 35 are placed in predetermined positions on the optical axis Ax.

The projection optical device 35 projects the image light entering from the image formation device 33 on a projected surface such as a screen. The projection optical device 35 may be e.g., a coupling lens including a plurality of lenses and a lens tube housing the plurality of lenses (not shown).

Configuration of Polarization Converter

FIG. 3 shows a section of the polarization converter 6 along the XZ-plane. In FIG. 3, of the lights passing through the polarization converter 6, optical paths of s-polarized lights are shown by solid lines with black circles and optical paths of p-polarized lights are shown by solid lines with orthogonal lines.

As shown in FIG. 3, the polarization converter 6 has a polarization separation element array 61 separating and outputting an incident luminous flux into two types of linearly-polarized lights, a plurality of wave plates 65, and a plurality of light shielding plates 66.

Configuration of Polarization Separation Element Array

The polarization separation element array 61 has a plurality of base materials 62, a plurality of the polarization separation portions 63 and a plurality of reflection portions 64. The polarization separation element array 61 is formed line-symmetrically with respect to a center line CL passing through the center in the +X direction and along the +Y direction. The center line CL crosses the optical axis Ax.

The respective plurality of base materials 62 are columnar members formed using a light-transmissive material such as a white plate glass and arranged along the X-axis. The plurality of base materials 62 include base materials 621 having isosceles right triangular sections along the XZ-plane and base materials 622 having trapezoidal sections along the XZ-plane, and these are combined and the polarization separation element array 61 having a plate shape as a whole is formed. The polarization separation portions 63 and the reflection portions 64 are placed between the respective base materials 62.

The respective plurality of polarization separation portions 63 and the respective plurality of reflection portions 64 are formed in rectangular shapes elongated along the Y-axis. The plurality of polarization separation portions 63 include polarization separation portions 631 to 636 and the plurality of reflection portions 64 include reflection portions 641 to 646.

The polarization separation portions 631, 633, 635 and the reflection portions 641, 643, 645 are alternately placed from the center line CL toward the +X direction. The polarization separation portions 632, 634, 636 and the reflection portions

642, 644, 646 are alternately placed from the center line CL toward the –X direction. The respective polarization separation portions 63 and the respective reflection portions 64 are inclined substantially at 45° relative to the optical axis Ax.

The respective polarization separation portions 63 include dielectric multilayer films and separate the lights entering from the light source device 4 via the lens arrays 51, 52 into the p-polarized lights and the s-polarized lights. Specifically, the respective polarization separation portions 63 transmit the p-polarized lights in the +Z direction and reflect the s-polarized lights of the lights entering in the +Z direction.

Each reflection portion 64 functions as a pair of the reflection portion 64 and the adjacent polarization separation portion 63. That is, one reflection portion 64 corresponds to one polarization separation portion 63 one-on-one and placed to face the polarization separation portion 63. The reflection portion 64 reflects the s-polarized light reflected by the polarization separation portion 63 forming a pair in the +Z direction along the traveling direction of the p-polarized light transmitted through the polarization separation portion 63. The reflection portion 64 includes a reflection film formed using a dielectric reflection film.

When the polarization separation element array 61 is seen from the light exiting side, the p-polarized light is output from a portion corresponding to the polarization separation portion 63 and the s-polarized light is output from a portion corresponding to the reflection portion 64.

Configuration of Wave Plate

Each of the plurality of wave plates 65 is a half-wavelength plate placed in an optical path of one linearly-polarized light of two types of linearly-polarized lights output from the polarization separation element array 61. Each of the plurality of wave plates 65 rotates the polarization direction of the entering one linearly-polarized light by 90° to be the same as the polarization direction of the other linearly-polarized light.

The plurality of wave plates 65 include wave plates 651 to 656. The wave plates 656, 654, 652, 651, 653, 655 are placed in positions overlapping with the polarization separation portions 636, 634, 632, 631, 633, 635 as seen from the +Z direction. That is, each wave plate 65 is placed in the optical path of the p-polarized light transmitted through the polarization separation portion 63 and converts the entering p-polarized light into the s-polarized light.

Figure 4:
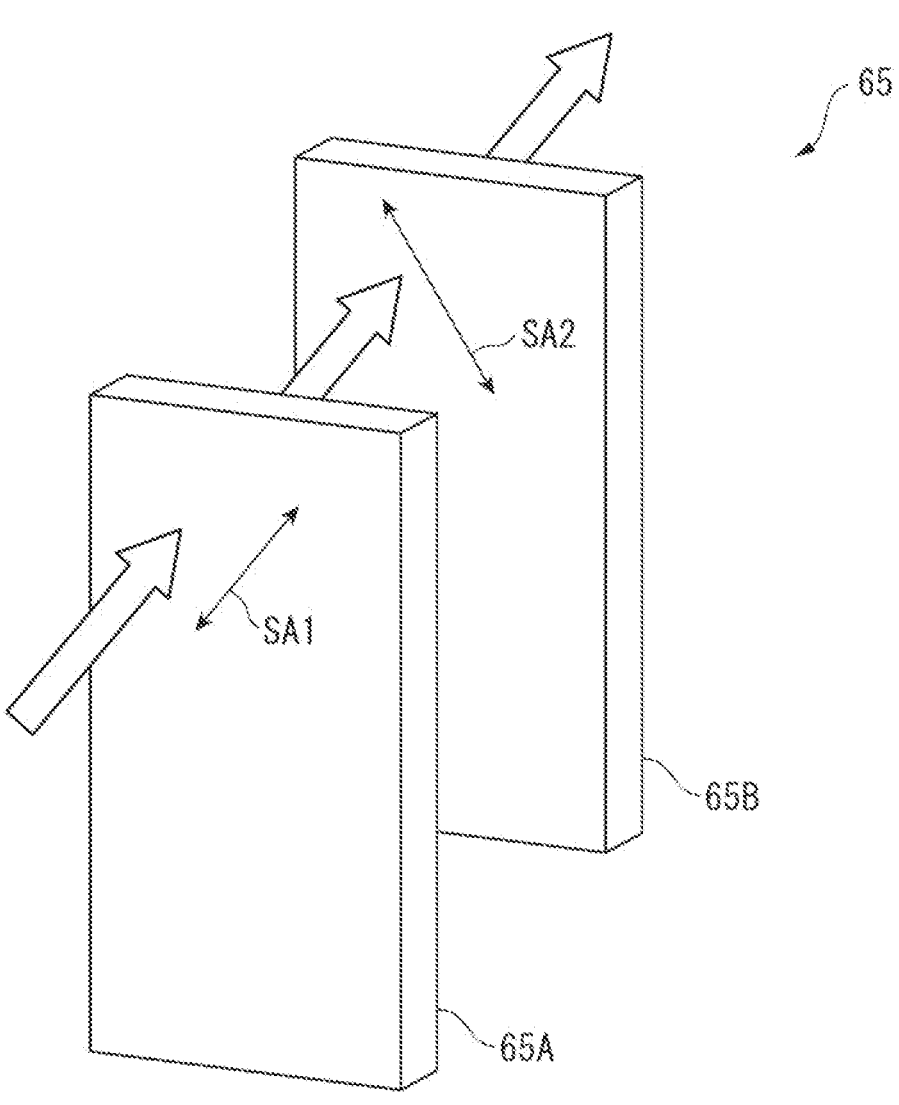
FIG. 4 is a schematic diagram showing a configuration of a wave plate according to the one embodiment.

FIG. 4 is a schematic diagram showing a configuration of the wave plate 65.

As shown in FIG. 4, the wave plate 65 is a quartz crystal wave plate having a first quartz crystal plate 65A and a second quartz crystal plate 65B.

The first quartz crystal plate 65A and the second quartz crystal plate 65B are placed to be superimposed on each other along the optical axis of the wave plate 65. For the respective quartz crystal plates 65A, 65B, optical axes including a phase-advancing axis and a phase-lagging axis are set. A phase-lagging axis SA1 of the first quartz crystal plate 65A and a phase-lagging axis SA2 of the second quartz crystal plate 65B are substantially orthogonal to each other as seen from the light incident side with respect to the wave plate 65. The phase-lagging axis SA1 of the first quartz crystal plate 65A and the phase-lagging axis SA2 of the second quartz crystal plate 65B are orthogonal to the normal lines of the incident surfaces in the respective quartz crystal plates 65A, 65B.

Note that the wave plate 65 can be formed using a single quartz crystal plate. However, when the wave plate 65 is formed using a single quartz crystal plate, the thickness of the quartz crystal plate in the direction in which light passes through the wave plate 65 is very thin and it is hard to form the quartz crystal plate. Accordingly, the wave plate 65 according to the embodiment is formed by superimposition of the two quartz crystal plates 65A, 65B.

Each of the plurality of light shielding plates 66 shown in FIG. 3 is provided at the light incident side with respect to the polarization separation element array 61. That is, the plurality of light shielding plates 66 are placed between the second lens array 52 and the polarization separation element array 61. Specifically, each of the plurality of light shielding plates 66 is placed in a position covering the reflection portion 64 when the polarization converter 6 is seen from the light incident side.

Each of the plurality of light shielding plates 66 shields the light entering the reflection portion 64 from the second lens array 52 not via the polarization separation portion 63.

Polarization Conversion Efficiency of Polarization Converter

The wave plate 65 as the second quartz crystal wave plate has a peak wavelength at which polarization rotation efficiency as efficiency for rotation of the polarization direction of one linearly-polarized light of the p-polarized light and the s-polarized light into that of the other linearly-polarized light is the highest. When a color light having the same wavelength as the peak wavelength of the wave plate 65 enters the wave plate 65, one linearly-polarized light may be efficiently converted into the other linearly-polarized light. On the other hand, as the wavelength of the color light entering the wave plate 65 is farther from the peak wavelength of the wave plate 65, the rotation efficiency of the linearly-polarized light by the wave plate 65 becomes lower.

Hereinafter, the peak wavelength of the wave plate 65 is referred to as "wave plate peak wavelength", a peak wavelength of the blue light is referred to as "blue peak wavelength", a peak wavelength of the green light is referred to as "green peak wavelength", and a peak wavelength of the red light is referred to as "red peak wavelength".

For example, a case where the percentage of the s-polarized light in the blue light of the illumination light WL entering the polarization converter 6 is 50% and the percentage of the p-polarized light is 50% is assumed. Note that a color light in the first wavelength range from 430 nm to 490 nm is the blue light, a color light in the second wavelength range from more than 490 nm to 550 nm is the green light, and a color light in the third wavelength range from more than 550 nm to 770 nm is the red light.

Note that, as described above, the blue peak wavelength is 455 nm, the green peak wavelength is 550 nm, and the red peak wavelength is 610 nm.

Figure 5:
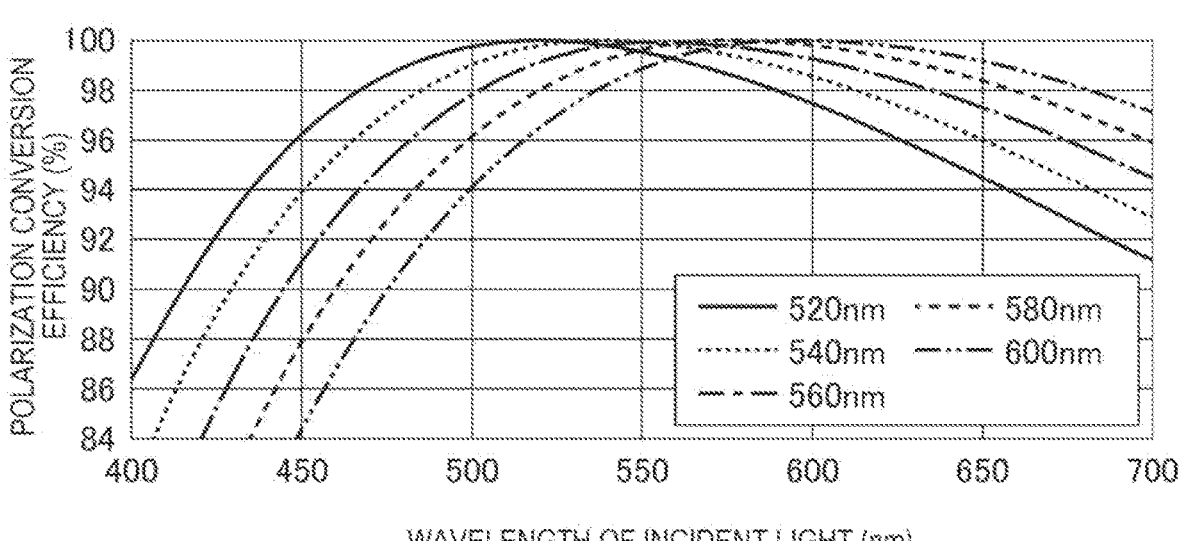
FIG. 5 is a graph showing polarization conversion efficiency of the polarization converter with respect to each peak wavelength of the wave plate when an illumination light having a percentage of an s-polarized light at 50% in a blue light is entered into the polarization converter according to the one embodiment.

FIG. 5 is a graph showing polarization conversion efficiency of the polarization converter 6 with respect to each peak wavelength of the wave plate 65 when the percentage of the s-polarized light in the blue light of the illumination light WL entering the polarization converter 6 is 50%. Note that the percentages of the s-polarized lights in the green light and the red light contained in the illumination light WL are 50%.

As shown by a solid line in FIG. 5, when the wave plate peak wavelength is 520 nm, the polarization rotation efficiency of the wave plate 65 for the green light is higher, and the p-polarized green light entering the wave plate 65 may be efficiently converted into the s-polarized green light. Accordingly, the green light output from the polarization converter 6 is almost the s-polarized green light.

However, the respective peak wavelengths of the blue light and the red light are farther from the wave plate peak wavelength, and the polarization rotation efficiency of the wave plate 65 for the blue light and the red light is lower. Accordingly, the p-polarized blue light entering the wave plate 65 is not efficiently converted into the s-polarized blue light, and the p-polarized red light entering the wave plate 65 is not efficiently converted into the s-polarized red light. On this account, the blue light and the red light output from the polarization converter 6 contain the higher percentages of the p-polarized blue light and the red light.

As described above, when the light output from the polarization converter 6 contains the higher percentage of the p-polarized light, the amount of light shielded by the light incident-side polarizer 332 is larger, the amount of light entering the light modulation element 333 is smaller, and thus, the brightness of the projection image is lower.

The tendency is the same as that when the wave plate peak wavelength is 540 nm as shown by a fine dot line in FIG. 5. As the wave plate peak wavelength is longer, the polarization rotation efficiency of the blue light is lower, but the polarization rotation efficiency of the green light and the red light is higher.

On the other hand, when the wave plate peak wavelength is 560 nm, the polarization rotation efficiency of the wave plate 65 for the green light is higher and the polarization rotation efficiency of the wave plate 65 for the red light is relatively high. Accordingly, as shown by a dash-dot line in FIG. 5, for example, at 550 nm as the green peak wavelength, the polarization conversion efficiency of the polarization converter 6 is substantially 100%, at 610 nm as the red peak wavelength, the polarization conversion efficiency of the polarization converter 6 is substantially 99%. As described above, the p-polarized green light and red light contained in the illumination light entering the polarization converter 6 may be efficiently converted into the s-polarized green light and red light.

However, compared to a case where the wave plate peak wavelength is shorter than 560 nm, a difference between the wave plate peak wavelength and 455 nm as the blue peak wavelength is even larger, and the polarization rotation efficiency of the wave plate 65 for the blue light is even lower and the polarization conversion efficiency for the blue light of the polarization converter 6 is even lower.

Accordingly, when the wave plate peak wavelength is 560 nm, the green light and the red light output from the polarization converter 6 are almost the s-polarized lights, and the blue light output from the polarization converter 6 contains the higher percentage of the p-polarized blue light.

The tendency is the same as that when the wave plate peak wavelength is 580 nm as shown by a coarse dot line in FIG. 5 and the same as that when the wave plate peak wavelength is 600 nm as shown by a dash-double-dot line in FIG. 5.

Figure 6:
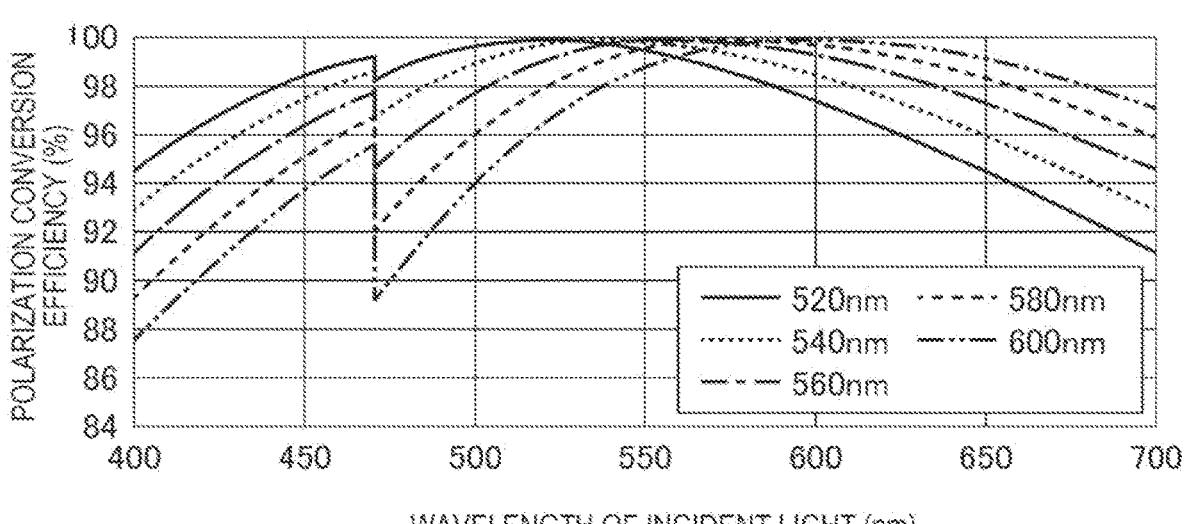
FIG. 6 is a graph showing polarization conversion efficiency of the polarization converter with respect to each peak wavelength of the wave plate when an illumination light having a percentage of the s-polarized light at 80% in the blue light is entered into the polarization converter according to the one embodiment.

FIG. 6 is a graph showing polarization conversion efficiency of the polarization converter 6 with respect to each peak wavelength of the wave plate 65 when the percentage of the s-polarized light in the blue light of the illumination light WL entering the polarization converter 6 is 80%. Note that the percentage of the s-polarized light in the green light contained in the illumination light WL entering the polarization converter 6 is 50% and the percentage of the s-polarized light in the red light is 50%. The polarization conversion efficiency is lower at the wavelength of 470 nm because the percentage of the s-polarized light in the blue light is higher than the percentage of the p-polarized light.

On the other hand, a case where the percentage of the s-polarized light in the blue light of the illumination light WL entering the polarization converter 6 is 80% and the percentage of the p-polarized light is 20% is assumed.

As shown by a solid line in FIG. 6, when the wave plate peak wavelength is 520 nm, as is the case shown by the solid line in FIG. 5, the polarization rotation efficiency of the wave plate 65 for the green light is higher and the p-polarized green light entering the wave plate 65 may be efficiently converted into the s-polarized green light. Further, the amount of p-polarized blue light entering the wave plate 65 is smaller, and the percentage of the s-polarized light in the blue light output from the polarization converter 6 is set to be higher than that in the case shown in FIG. 5.

However, the red peak wavelength is farther from the wave plate peak wavelength and the polarization rotation efficiency of the wave plate 65 for the red light is lower. Accordingly, the p-polarized red light entering the wave plate 65 is not efficiently converted into the s-polarized red light, and the red light output from the polarization converter 6 contains the higher percentage of the p-polarized red light.

The tendency is the same as that when the wave plate peak wavelength is 540 nm as shown by a fine dot line in FIG. 6. As is the case shown in FIG. 5, as the wave plate peak wavelength is longer, the polarization rotation efficiency of the blue light is lower, but the polarization rotation efficiency of the green light and the red light is higher.

On one hand, as shown by a dash-dot line in FIG. 6, when the wave plate peak wavelength is 560 nm, as is the case shown by the dash-dot line in FIG. 5, the polarization conversion efficiency for the green light is higher and the polarization conversion efficiency for the red light is relatively high. Accordingly, the p-polarized green light and red light entering the wave plate 65 may be efficiently converted into the s-polarized green light and red light.

On the other hand, the percentage of the p-polarized light in the blue light entering the polarization converter 6 is lower than that in the case shown in FIG. 5, and therefore, even when the polarization rotation efficiency of the wave plate 65 for the blue light is lower, the polarization conversion efficiency for the blue light by the polarization converter 6 may be made higher.

Accordingly, when the wave plate peak wavelength is 560 nm, the green light and the red light output from the polarization converter 6 are almost the s-polarized lights, and the blue light output from the polarization converter 6 contains the higher percentage of the s-polarized blue light than that in the case shown in FIG. 5.

The tendency is the same as that when the wave plate peak wavelength is 580 nm as shown by a coarse dot line in FIG. 6 and the same as that when the wave plate peak wavelength is 600 nm as shown by a dash-double-dot line in FIG. 6.

Figure 7:
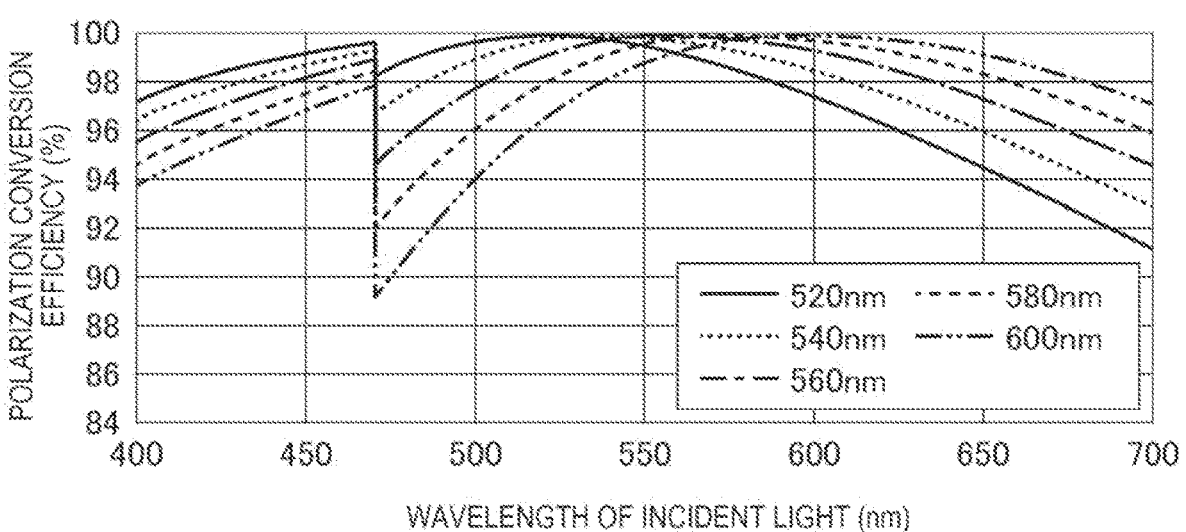
FIG. 7 is a graph showing polarization conversion efficiency of the polarization converter with respect to each peak wavelength of the wave plate when an illumination light having a percentage of the s-polarized light at 90% in the blue light is entered into the polarization converter according to the one embodiment.

FIG. 7 is a graph showing polarization conversion efficiency of the polarization converter 6 with respect to each peak wavelength of the wave plate 65 when the percentage of the s-polarized light in the blue light of the illumination light WL entering the polarization converter 6 is 90%. Note that the percentage of the s-polarized light in the green light contained in the illumination light WL entering the polarization converter 6 is 50% and the percentage of the s-polarized light in the red light is 50%. The polarization conversion efficiency is lower at the wavelength 470 nm because the percentage of the s-polarized light in the blue light is higher than the percentage of the p-polarized light.

The polarization conversion efficiency of the polarization converter 6 described in FIGS. 5 and 6 is further improved when the illumination light WL having the percentage of the s-polarized light in the blue light at 90% is entered into the polarization converter 6.

For example, as shown by a solid line in FIG. 7, when the wave plate peak wavelength is 520 nm, as is the cases shown by the solid lines in FIGS. 5 and 6, the polarization rotation efficiency of the wave plate 65 for the green light is higher and the p-polarized green light may be efficiently converted into the s-polarized green light. Further, the amount of p-polarized blue light entering the wave plate 65 is smaller, and the percentage of the s-polarized light in the blue light output from the polarization converter 6 may be made even higher than that in the case shown in FIG. 6.

However, the polarization rotation efficiency of the wave plate 65 for the red light is lower, and the red light output from the polarization converter 6 contains the higher percentage of the p-polarized red light.

The tendency is the same as that when the wave plate peak wavelength is 540 nm as shown by a fine dot line in FIG. 7. As is the case shown in FIG. 6, as the wave plate peak wavelength is longer, the polarization rotation efficiency of the blue light is lower, but the polarization rotation efficiency of the green light and the red light is higher.

On the other hand, as shown by a dash-dot line in FIG. 7, when the wave plate peak wavelength is 560 nm, as is the case shown by the dash-dot lines in FIGS. 5 and 6, the polarization rotation efficiency for the green light and the red light of the wave plate 65 is higher, and the p-polarized green light of the illumination light entering the polarization converter 6 may be efficiently converted into the s-polarized green light and the p-polarized red light may be efficiently converted into the s-polarized red light.

Further, compared to the case shown in FIG. 6, the percentage of the p-polarized light in the blue light entering the polarization converter 6 is even lower, and therefore, even when the polarization rotation efficiency of the wave plate 65 for the blue light is lower, the amount of p-polarized blue light entering the wave plate 65 is even smaller, and the polarization conversion efficiency for the blue light contained in the illumination light WL of the polarization converter 6 may be made higher.

Accordingly, when the wave plate peak wavelength is 560 nm, the blue light, the green light, and the red light output from the polarization converter 6 are almost the s-polarized blue light, green light, and red light.

As shown by a coarse dot line or a dash-double-dot line in FIG. 7, the case where the wave plate peak wavelength is 580 nm or 600 nm is the same as the case where the wave plate peak wavelength is 560 nm.

The inventor of the present disclosure measured polarization conversion efficiency of the polarization converter 6 for the respective color lights contained in the illumination light WL using the polarization converter 6 having the peak wavelength of the wave plate 65 at 580 nm.

In measurement results of the polarization conversion efficiency, of the illumination light WL entering the polarization converter 6, the polarization conversion efficiency of the polarization converter 6 for the green light was 100% and the polarization conversion efficiency of the polarization converter 6 for the red light was 100%.

On the other hand, of the illumination light WL entering the polarization converter 6, when the percentage of the s-polarized light in the blue light is 60% and the percentage of the p-polarized light in the blue light is 40%, the polarization conversion efficiency of the polarization converter 6 for the blue light was 91%.

Of the illumination light WL entering the polarization converter 6, when the percentage of the s-polarized light in the blue light is 70% and the percentage of the p-polarized light in the blue light is 30%, the polarization conversion efficiency of the polarization converter 6 for the blue light was 93%.

Of the illumination light WL entering the polarization converter 6, when the percentage of the s-polarized light in the blue light is 80% and the percentage of the p-polarized light in the blue light is 20%, the polarization conversion efficiency of the polarization converter 6 for the blue light was 96%.

Of the illumination light WL entering the polarization converter 6, when the percentage of the s-polarized light in the blue light is 90% and the percentage of the p-polarized light in the blue light is 10%, the polarization conversion efficiency of the polarization converter 6 for the blue light was 98%.

From these results, when the wave plate peak wavelength is equal to or longer than 560 nm longer than the green peak wavelength and equal to or shorter than 600 nm shorter than the red peak wavelength, and the illumination light WL having the percentage of the s-polarized light in the blue light at 80% or more enters the polarization converter 6, the blue light, the green light, and the red light output from the polarization converter 6 may be almost the s-polarized blue light, green light, and red light.

Note that, as described above, when the percentage of the s-polarized light in the blue light contained in the illumination light WL is higher than 50%, the amount of the p-polarized blue light entering the wave plate 65 may be smaller than that in the case shown in FIG. 5. Accordingly, when the wave plate peak wavelength is from 560 nm to 600 nm, in the blue light contained in the illumination light WL, the percentage of the s-polarized blue light is higher than 50% and the percentage of the p-polarized blue light is lower than 50%, and thereby, the percentage of the s-polarized light in the blue light output from the polarization converter 6 may 6 may be made higher than that in the case shown in FIG. 5.

Change Rates in Amounts of Color Lights

Next, change rates in amounts of color lights output from the polarization converter 6 and changes in luminance of the output light from the polarization converter 6 will be explained.

As described above, the blue light BL derived from the light emitting device 411 and the green light and the red light contained in the non-polarized fluorescence YL enter the polarization converter 6.

Here, the respective amounts of the blue light, the green light, and the red light output from the polarization converter 6 and the luminance of the output light of the polarization converter 6 change according to the wave plate peak wavelength. Note that the luminance of the output light of the polarization converter 6 is a total of values obtained by multiplication of the respective amounts of the blue light, the green light, and the red light by relative luminous efficiency.

Figure 8:
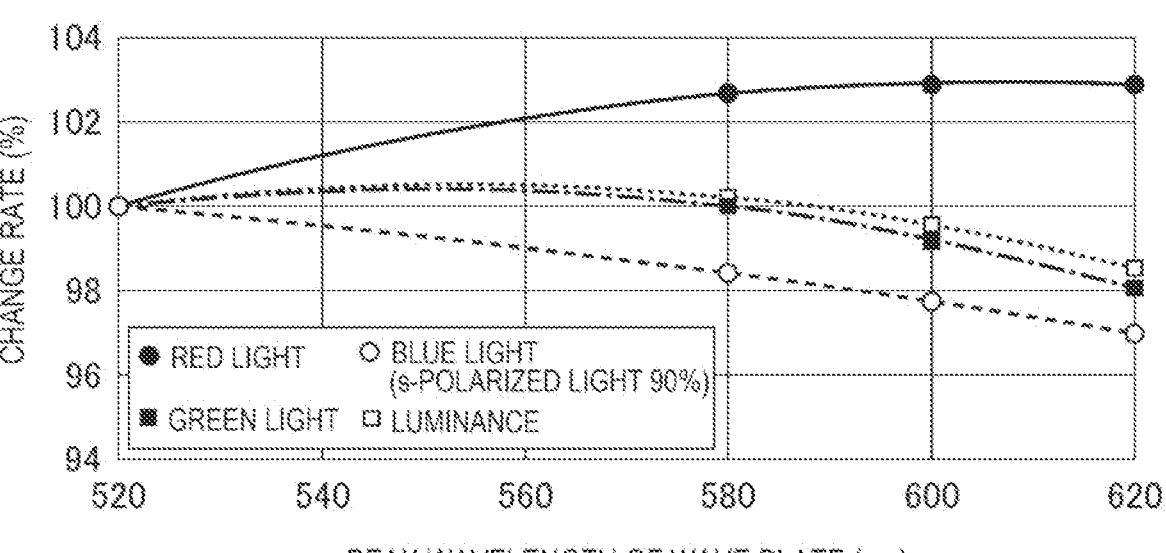
FIG. 8 is a graph showing change rates in amount of respective color lights output from the polarization converter and a change rate in luminance of the output light from the polarization converter with respect to each peak wavelength of the wave plate according to the one embodiment.

FIG. 8 is a graph showing relationships between the change rates in amounts of respective color lights output from the polarization converter 6 and the change rate in luminance of the output light from the polarization converter 6 and the wave plate peak wavelength. Note that FIG. 8 shows the change rates in amounts and the change rate in luminance of the respective color lights when the amounts of the respective color lights output from the polarization converter 6 having the wave plate peak wavelength at 520 nm are 100% and the luminance of the output light of the polarization converter 6 is 100%.

As shown in FIG. 8, when the percentage of the s-polarized light in the blue light entering the polarization converter 6 is 90%, in the range of the wave plate peak wavelength from 520 nm to 620 nm, the amount of the blue light output from the polarization converter 6 is smaller as the wave plate peak wavelength is longer.

In the range of the wave plate peak wavelength from 520 nm to less than 550 nm, the amount of the green light output from the polarization converter 6 is larger as the wave plate peak wavelength is longer and, in the range of the wave plate peak wavelength from 520 nm to 620 nm, is smaller as the wave plate peak wavelength is longer.

In the range of the wave plate peak wavelength from 520 nm to 620 nm, the amount of the red light output from the polarization converter 6 is larger as the wave plate peak wavelength is longer.

Further, like the change in amount of the green light, in the range of the wave plate peak wavelength from 520 nm to less than 550 nm, the luminance of the output light from the polarization converter 6 is higher as the wave plate peak wavelength is longer and, in the range of the wave plate peak wavelength from 550 nm to 620 nm, is lower as the wave plate peak wavelength is longer.

Accordingly, in the range of the wave plate peak wavelength from 560 nm to 600 nm as the range in which the output light from the polarization converter 6 is almost the s-polarized light, the polarization converter 6 having the wave plate peak wavelength at 560 nm has a property that the luminance of the output light is the highest. Further, the polarization converter 6 having the wave plate peak wavelength at 580 nm has a property with balanced amounts of the respective color lights, and the polarization converter 6 having the wave plate peak wavelength at 600 nm has a property with a larger amount of red light contained in the output light.

Peak Wavelength Settings of Wave Plate

Figure 9:
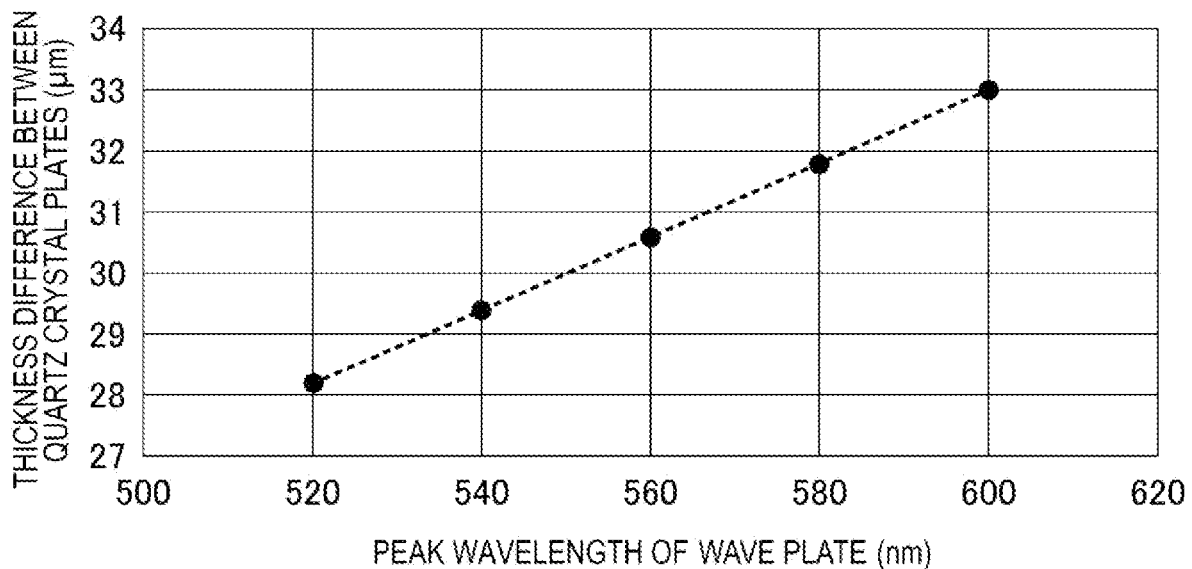
FIG. 9 is a graph showing a relationship between the peak wavelength of the wave plate and a thickness difference between two quartz crystal plates according to the one embodiment.

FIG. 9 is a graph showing a relationship between the wave plate peak wavelength and a thickness difference between the two quartz crystal plates 65A, 65B.

As described above, it is preferable that the wave plate peak wavelength is from 560 nm to 600 nm. The wave plate peak wavelength may be set for the wave plate 65 by the difference between the thickness of the first quartz crystal plate 65A on the optical axis of the wave plate 65 and the thickness of the second quartz crystal plate 65B on the optical axis of the wave plate 65. Hereinafter, the difference between the thickness of the first quartz crystal plate 65A on the optical axis of the wave plate 65 and the thickness of the second quartz crystal plate 65B on the optical axis of the wave plate 65 is referred to as "thickness difference".

As shown in FIG. 9, in a range of the thickness difference from 28 μm to 33 μm, as the thickness difference is larger, the wave plate peak wavelength is longer from about 520 nm and, when the thickness difference is 33 μm, the wave plate peak wavelength is 600 nm.

Accordingly, the thickness difference between the quartz crystal plates 65A, 65B is set to be from 31 μm to 33 μm, and thereby, the wave plate peak wavelength may be the value from 560 nm to 600 nm. For example, the thickness difference between the quartz crystal plates 65A, 65B is set to about 30.6 μm, and thereby, the wave plate peak wavelength may be 560 nm. For example, the thickness difference between the quartz crystal plates 65A, 65B is set to about 31.8 μm, and thereby, the wave plate peak wavelength may be 580 nm. Or, as described above, the thickness difference between the quartz crystal plates 65A, 65B is set to about 33 μm, and thereby, the wave plate peak wavelength may be 600 nm.

Effects of Embodiment

The projector 1 according to the above described embodiment have the following effects.

The projector 1 includes the illumination apparatus LE, the light modulation device LM, and the projection optical device 35.

The light modulation device LM modulates the light output from the illumination apparatus LE.

The projection optical device 35 projects the light modulated in the light modulation device LM.

The illumination apparatus LE includes the light source device 4 and the polarization converter 6.

The light source device 4 outputs the light containing the blue light, the green light, and the red light. The blue light is the first color light in the first wavelength range from 430 nm to 490 nm, the green light is the second color light in the second wavelength range from more than 490 nm as the longer wavelength than that of the first wavelength range to 550 nm, and the red light is the third color light in the third wavelength range from more than 550 nm as the longer wavelength than that of the second wavelength range to 770 nm.

Note that, in the embodiment, the boundary between the second wavelength range and the third wavelength range is 550 nm, however, the boundary is not limited to that, but may be e.g., 590 nm. In this case, the color light having the wavelength of 590 nm may be the green light or the red light.

The polarization converter 6 converts the p-polarized light of the light output from the light source device 4 into the s-polarized light. The p-polarized light is the first polarized light and the s-polarized light is the second polarized light different from the first polarized light. The polarization converter 6 has the polarization separation portion 63 and the wave plate 65.

The polarization separation portion 63 separates the light output from the light source device 4 into the p-polarized light and the s-polarized light. The wave plate 65 converts the p-polarized light separated by the polarization separation portion 63 into the s-polarized light.

80% or more of the blue light output from the light source device 4 is the s-polarized light.

When the wavelength at which the polarization rotation efficiency of the wave plate 65 is highest is the wave plate peak wavelength, the wave plate peak wavelength is longer than the peak wavelength of the green light and shorter than the peak wavelength of the red light.

Here, as the peak wavelength of the incident light to the wave plate 65 is farther from the wave plate peak wavelength, the polarization rotation efficiency of the wave plate 65 for the incident light is lower.

Therefore, according to the above described configuration, the peak wavelengths of the green light and the red light are close to the wave plate peak wavelength. Accordingly, the p-polarized green light and red light may be efficiently converted into the s-polarized green light and red light by the wave plate 65. Thus, the percentage of the s-polarized green light in the green light output from the polarization converter 6 may be increased and the percentage of the s-polarized red light in the red light output from the polarization converter 6 may be increased.

On the other hand, the peak wavelength of the blue light is farther from the wave plate peak wavelength than the peak wavelength of the green light, and the polarization rotation efficiency of the wave plate 65 for the blue light is lower and the p-polarized blue light is not efficiently converted into the s-polarized blue light by the wave plate 65. However, 80% or more of the blue light output from the light source device 4 and entering the polarization converter 6 is the s-polarized blue light. Thus, the amount of the p-polarized blue light entering the wave plate 65 may be reduced and the percentage of the s-polarized light in the blue light output from the polarization converter 6 may be increased.

Therefore, the percentage of the s-polarized light in the output light from the illumination apparatus LE may be increased. Further, the projector 1 including the illumination apparatus LE may increase the amount of light available for the image formation by the light modulation device LM, and the brightness of the image projected by the projector 1 may be increased.

In the illumination apparatus LE, the blue light corresponds to the first color light, the green light corresponds to the second color light, and the red light corresponds to the third color light.

According to the configuration, the light output from the illumination apparatus LE contains the blue light, the green light, and the red light, and thereby, the white light having the higher percentage of the s-polarized light may be output.

In the illumination apparatus LE, the light source device 4 includes the light emitting device 411 and the wavelength converter 45.

The light emitting device 411 outputs the s-polarized blue light.

The wavelength converter 45 is excited by the blue light output from the light emitting device 411 and outputs the p-polarized green light, the s-polarized green light, the p-polarized red light, and the s-polarized red light.

The peak wavelength of the blue light is 455 nm, the peak wavelength of the green light is 550 nm, and the peak wavelength of the red light is 610 nm.

According to the configuration, compared to a light source device having a light source lamp, the polarization state of the blue light output from the light source device 4 is controlled more easily. Accordingly, the percentage of the s-polarized light in the blue light entering the polarization converter 6 from the light source device 4 may be adjusted more easily.

Further, the polarization converter widely used for the light source device outputs the green light having the peak wavelength at 550 nm and the red light having the peak wavelength at 610 nm. Therefore, the light source device 4 outputting the respective color lights having the above described peak wavelengths may be simply configured.

In the illumination apparatus LE, the wave plate peak wavelength at which the polarization conversion efficiency of the wave plate 65 is the highest is from 560 nm to 600 nm.

According to the configuration, the polarization rotation efficiency of the wave plate 65 for the green light and the polarization rotation efficiency of the wave plate 65 for the red light may be increased. Therefore, the percentage of the s-polarized light in the light output from the illumination apparatus LE may be further increased.

Compared to a case where the wave plate peak wavelength is shorter than 560 nm, the polarization rotation efficiency of the wave plate 65 for the red light may be made higher. Further, compared to a case where the wave plate peak wavelength is longer than 600 nm, the polarization rotation efficiency of the wave plate 65 for the blue light and the green light may be made higher. Therefore, the color balance of lights output from the illumination apparatus LE may be maintained.

In the illumination apparatus LE, the wave plate 65 is the quartz crystal wave plate having the quartz crystal plates 65A, 65B.

The quartz crystal wave plate has higher durability and is harder to be degraded with time than a wave plate having a retardation film. Therefore, the wave plate 65 as the quartz crystal wave plate is used for the polarization converter 6, and thereby, the durability of the illumination apparatus LE may be increased.

In the illumination apparatus LE, the quartz crystal plates of the wave plate 65 includes the first quartz crystal plate 65A having the phase-lagging axis SA1 and the second quartz crystal plate 65B having the phase-lagging axis SA2 orthogonal to the phase-lagging axis SA1 of the first quartz crystal plate 65A as seen from the light incident side. The difference between the thickness of the first quartz crystal plate 65A and the thickness of the second quartz crystal plate 65B on the optical axis of the wave plate 65 is from 31 μm to 33 μm.

Here, when the wave plate peak wavelength of the quartz crystal wave plate having a single quartz crystal plate is set to be longer than the peak wavelength of the green light and shorter than the peak wavelength of the red light, it is necessary to form the quartz crystal plate thinner. For example, when the quartz crystal wave plate having the wave plate peak wavelength at 560 nm is manufactured, it is necessary to form the single quartz crystal plate having the thickness of about 30.6 μm. Accordingly, it is difficult to manufacture the wave plate having the peak wavelength in the range.

On the other hand, the difference between the thickness of the first quartz crystal plate 65A and the thickness of the second quartz crystal plate 65B is set to a value within the above described range, and thereby, the wave plate 65 having the above described wave plate peak wavelength may be formed. Therefore, the wave plate 65 may be easily manufactured and handled.

Modifications of Embodiment

The present disclosure is not limited to the above described embodiment and the present disclosure includes modifications, improvements, etc. within the range in which the purpose of the present disclosure can be achieved.

In the above described embodiment, the illumination apparatus LE includes the light source device 4 and the homogenization system 5, and the homogenization system 5 includes the first lens array 51, the second lens array 52, the polarization converter 6, and the superimposing lens 53. However, the illumination apparatus LE may not include at least one of the lens arrays 51, 52 and the superimposing lens 53.

In the above described embodiment, the light source device 4 includes the light emitting device 411 and the wavelength converter 45. However, the configuration of the light source device 4 may be another configuration. That is, the configuration of the light source device 4 is not limited to the configuration shown in FIG. 2. For example, the light source device may include a light emitting device outputting a blue light, a light emitting device outputting a green light, and a light emitting device outputting a red light or include a light source lamp.

Further, the light emitting device 411 is not limited to the LD, but may be an LED (Light Emitting Diode).

The wavelength converter 45 may be rotated around a rotation axis along the optical axis Ax2 by a drive unit such as a motor and the diffuse reflection element 47 may be rotated around a rotation axis along the optical axis Ax1 by another drive unit. Further, the wavelength converter 45 may be a transmissive wavelength converter outputting the fluorescence YL along the incident direction of the blue light BL.

In the above described embodiment, the first color light is the blue light having the peak wavelength at 455 nm, the second color light is the green light having the peak wavelength at 550 nm, and the third color light is the red light having the peak wavelength at 610 nm. However, as long as the second color light is a color light in the second wavelength range having the longer wavelengths than the first wavelength range and the third color light is a color light in the third wavelength range having the longer wavelengths than the second wavelength range, the first color light, the second color light, and the third color light are not necessarily the blue light, the green light, and the red light.

Further, the peak wavelength of the blue light is not necessarily 455 nm, the peak wavelength of the green light is not necessarily 550 nm, and the peak wavelength of the red light is not necessarily 610 nm.

In the above described embodiment, the peak wavelength of the wave plate 65 applied to the polarization converter 6 is from 560 nm to 600 nm. However, the peak wavelength of the wave plate is not limited to the above described range as long as the peak wavelength is longer than the peak wavelength of the second color light output from the light source device and entering the polarization converter and shorter than the peak wavelength of the third color light output from the light source device and entering the polarization converter.

In the above described embodiment, the wave plate 65 is the quartz crystal wave plate having the quartz crystal plates. However, the wave plate applied to the polarization converter 6 may be a wave plate formed by provision of a retardation film on a light-transmissive substrate or a retardation film provided on the base material 62 forming the polarization converter 6.

When the wave plate 65 is the quartz crystal wave plate, the wave plate may have a single quartz crystal plate.

In the above described embodiment, the light emitting device 411 of the light source 41 outputs the s-polarized blue light BL. However, the percentage of the s-polarized light in the light output from the wave plate may be adjusted by placement of the wave plate between the light emitting device 411 and the wavelength converter 45, specifically, between the light emitting device 411 and the light separation unit 43 and rotation of the wave plate around an axis parallel to the traveling direction of the entering light.

In the above described embodiment, 80% or more of the blue light output from the light source device 4 is the s-polarized light. However, as long as 50% of the blue light output from the light source device 4 is the s-polarized blue light, the percentage of the s-polarized light in the light output from the illumination apparatus LE may be made higher compared to a case where less than 50% of the blue light output from the light source device 4 is the s-polarized blue light.

In the above described embodiment, the p-polarized light corresponds to the first polarized light and the s-polarized light corresponds to the second polarized light. However, the s-polarized light may be the first polarized light and the p-polarized light may be the second polarized light.

In the above described embodiment, the projector 1 includes the three light modulation elements 333R, 333G, 333B. However, the present disclosure can be applied to a projector including two or less or four or more light modulation elements.

In the above described embodiment, the light modulation element 333 is the transmissive liquid crystal panel in which the light incident surface and the light exiting surface are different. However, the light modulation element 333 of the projector 1 may be a reflective liquid crystal panel in which the light incident surface and the light exiting surface are the same. Further, another light modulation device than the liquid crystal device including a device using a micromirror e.g., a device using a DMD (Digital Micromirror Device) that can modulate incident luminous flux and form an image according to image information may be used. In this case, the light incident-side polarizer 332 and the light exiting-side polarizer 335 may be omitted.

In the above described embodiment, the example in which the illumination apparatus LE is applied to the projector 1 is taken. However, the illumination apparatus according to the present disclosure can be applied to lighting equipment, a headlight of an automobile, or the like.

Summary of the Present Disclosure

As below, the summary of the present disclosure will be appended.

Appendix 1

An illumination apparatus includes a light source device outputting a light containing a first color light in a first wavelength range, a second color light in a second wavelength range having longer wavelengths than the first wavelength range, and a third color light in a third wavelength range having longer wavelengths than the second wavelength range, and a polarization converter converting a first polarized light of the light output from the light source device into a second polarized light different from the first polarized light, wherein the polarization converter has a polarization separation portion separating the light output from the light source device into the first polarized light and the second polarized light, and a wave plate converting the first polarized light separated by the polarization separation portion into the second polarized light, 80% or more of the first color light output from the light source device is the second polarized light, and a wavelength at which polarization rotation efficiency of the wave plate is the highest is longer than a peak wavelength of the second color light and shorter than a peak wavelength of the third color light.

Hereinafter, the wavelength at which the polarization rotation efficiency of the wave plate is the highest is referred to as "wave plate peak wavelength".

Here, as a peak wavelength of an incident light to the wave plate is farther from the wave plate peak wavelength, the polarization rotation efficiency of the wave plate for the incident light is lower.

On this account, according to the above described configuration, the respective peak wavelengths of the second color light and the third color light are close to the wave plate peak wavelength. Accordingly, the second color light as the first polarized light may be efficiently converted into the second color light as the second polarized light and the third color light as the first polarized light may be efficiently converted into the third color light as the second polarized light by the wave plate. Therefore, a percentage of the second color light as the second polarized light in the second color light output from the polarization converter may be increased and a percentage of the third color light as the second polarized light in the third color light output from the polarization converter may be increased.

On the other hand, the peak wavelength of the first color light is farther from the wave plate peak wavelength than the peak wavelength of the second color light, and the polarization rotation efficiency of the wave plate for the first color light is lower and the first color light as the first polarized light is not efficiently converted into the first color light as the second polarized light. However, 80% or more of the first color light entering the polarization converter from the light source device is the first color light as the second polarized light. On this account, an amount of the first color light as the first polarized light entering the wave plate may be reduced and the percentage of the first color light as the second polarized light in the first color light output from the polarization converter may be increased.

Therefore, the percentage of the second polarized light in the light output from the illumination apparatus may be increased.

Appendix 2

In the illumination apparatus according to Appendix 1, the first color light is a blue light, the second color light is a green light, and the third color light is a red light.

According to the configuration, the light output from the illumination apparatus contains the blue light, the green light, and the red light, and a white light at a higher percentage of the second polarized light may be output.

Appendix 3

In the illumination apparatus according to Appendix 1 or Appendix 2, the light source device includes a light emitting device outputting the first color light as the second polarized light, and a wavelength converter excited by the first color light output from the light emitting device and outputting the second color light as the first polarized light, the second color light as the second polarized light, the third color light as the first polarized light, and the third color light as the second polarized light, a peak wavelength of the first color light is 455 nm, the peak wavelength of the second color light is 550 nm, and the peak wavelength of the third color light is 610 nm.

According to the configuration, compared to a light source device including a light source lamp, a polarization state of the first color light output from the light source device is controlled more easily. Accordingly, the percentage of the second polarized light in the first color light entering the polarization converter from the light source device may be adjusted more easily.

Further, the polarization converter widely used for the light source device outputs the green light having the peak wavelength at 550 nm and the red light having the peak wavelength at 610 nm. Therefore, the light source device outputting the respective color lights having the above described peak wavelengths may be simply configured.

Appendix 4

In the illumination apparatus according to Appendix 3, the wavelength at which the polarization conversion efficiency of the wave plate is the highest is from 560 nm to 600 nm.

According to the configuration, the polarization rotation efficiency of the wave plate for the second color light and the polarization rotation efficiency of the wave plate for the third color light may be increased. Therefore, the percentage of the second polarized light in the light output from the illumination apparatus may be further increased.

For example, compared to a case where the wave plate peak wavelength is shorter than 560 nm, the polarization rotation efficiency of the wave plate for the third color light may be made higher. Further, for example, compared to a case where the wave plate peak wavelength is longer than 600 nm, the polarization rotation efficiency of the wave plate for the first color light and the second color light may be made higher. Therefore, the color balance of lights output from the illumination apparatus may be maintained.

Appendix 5

In the illumination apparatus according to any one of Appendix 1 to Appendix 4, the wave plate is a quartz crystal wave plate having a quartz crystal plate.

The quartz crystal wave plate has higher durability and is harder to be degraded with time than a wave plate having a retardation film. Therefore, the quartz crystal wave plate is used for the polarization converter, and thereby, the durability of the illumination apparatus may be increased.

Appendix 6

In the illumination apparatus according to Appendix 5, the quartz crystal plate includes a first quartz crystal plate having a phase-lagging axis, and a second quartz crystal plate having a phase-lagging axis orthogonal to the phase-lagging axis of the first quartz crystal plate as seen from a light incident side, and a difference between a thickness of the first quartz crystal plate and a thickness of the second quartz crystal plate on an optical axis of the wave plate is from 31 µm to 33 µm.

Here, when the wave plate peak wavelength of the quartz crystal wave plate having a single quartz crystal plate is set to be longer than the peak wavelength of the second color light and shorter than the peak wavelength of the third color light, it is necessary to form the quartz crystal plate thinner and it is difficult to manufacture the wave plate.

On the other hand, the difference between the thickness of the first quartz crystal plate and the thickness of the second quartz crystal plate is set to a value within the above described range, and thereby, the wave plate having the above described wave plate peak wavelength may be formed. Therefore, the wave plate may be easily manufactured and handled.

Appendix 7

A projector includes the illumination apparatus according to any one of Appendix 1 to Appendix 6, a light modulation device modulating a light output from the illumination apparatus, and a projection optical device projecting the light modulated in the light modulation device.

According to the projector, the same effects as those of the above described illumination apparatus may be exerted. In addition, the amount of light available for the image formation by the light modulation device may be increased, and the brightness of the image projected by the projector may be increased.

What is claimed is:

1. An illumination apparatus comprising:
a light source device configured to emit a light containing a first color light having a first wavelength range, a second color light having a second wavelength range belonging to longer wavelengths than the first wavelength range, and a third color light having a third wavelength range belonging to longer wavelengths than the second wavelength range; and a polarization converter converting a first polarized light of the light emitted from the light source device into a second polarized light different from the first polarized light, wherein the polarization converter has a polarization separation part separating the light emitted from the light source device into the first polarized light and the second polarized light, and a wave plate converting the first polarized light separated by the polarization separation part into the second polarized light, 80% or more of the first color light output from the light source device is the second polarized light, and a wavelength at which polarization rotation efficiency of the wave plate is the highest is longer than a peak wavelength of the second color light and shorter than a peak wavelength of the third color light.

2. The illumination apparatus according to claim 1, wherein the first color light is a blue light, the second color light is a green light, and the third color light is a red light.

3. The illumination apparatus according to claim 1, wherein the light source device includes:

a light emitting device configured to emit the first color light as the second polarized light; and a wavelength converter excited by the first color light emitted from the light emitting device and emitting the second color light as the first polarized light, the second color light as the second polarized light, the third color light as the first polarized light, and the third color light as the second polarized light, a peak wavelength of the first color light is 455 nm, the peak wavelength of the second color light is 550 nm, and the peak wavelength of the third color light is 610 nm.

4. The illumination apparatus according to claim 3, wherein the wavelength at which the polarization conversion efficiency of the wave plate is the highest is from 560 nm to 600 nm.

5. The illumination apparatus according to claim 1, wherein the wave plate is a quartz crystal wave plate having a quartz crystal plate.

6. The illumination apparatus according to claim 5, wherein the quartz crystal plate includes:

a first quartz crystal plate having a phase-lagging axis; and a second quartz crystal plate having a phase-lagging axis orthogonal to the phase-lagging axis of the first quartz crystal plate as seen from a light incident side, and a difference between a thickness of the first quartz crystal plate and a thickness of the second quartz crystal plate on an optical axis of the wave plate is from 31 μm to 33 μm.

7. A projector comprising:

the illumination apparatus according to claim 1;

a light modulation device modulating the light emitted from the illumination apparatus; and a projection optical device projecting the light modulated in the light modulation device.

* * * * *